(12) United States Patent
Yin et al.

(10) Patent No.: US 11,783,324 B2
(45) Date of Patent: Oct. 10, 2023

(54) RESOURCE SHARING METHOD, APPARATUS, AND DEVICE

(71) Applicant: Advanced New Technologies Co., Ltd., Grand Cayman (KY)

(72) Inventors: Huanmi Yin, Hangzhou (CN); Feng Lin, Hangzhou (CN); Guofei Jiang, Hangzhou (CN); Jun Wu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 93 days.

(21) Appl. No.: 17/084,916

(22) Filed: Oct. 30, 2020

(65) Prior Publication Data
US 2021/0049592 A1 Feb. 18, 2021

Related U.S. Application Data

(63) Continuation of application No. PCT/CN2019/100694, filed on Aug. 15, 2019.

(30) Foreign Application Priority Data

Sep. 25, 2018 (CN) .......................... 201811113518.0

(51) Int. Cl.
*G06Q 20/38* (2012.01)
*G06Q 20/06* (2012.01)
(Continued)

(52) U.S. Cl.
CPC ......... *G06Q 20/382* (2013.01); *G06Q 20/065* (2013.01); *G06Q 20/3224* (2013.01);
(Continued)

(58) Field of Classification Search
None
See application file for complete search history.

(56) References Cited

U.S. PATENT DOCUMENTS 7,127,236 B2 * 10/2006 Khan ...................... G06Q 20/02
  455/414.1
8,376,227 B2 * 2/2013 Hammad ............. G06Q 20/322
  235/384
(Continued)

FOREIGN PATENT DOCUMENTS

CA     2990224 A1 *  6/2018 ............. G06F 21/34
CN     107169125     9/2017
(Continued)

OTHER PUBLICATIONS

Odysseas Lamtzidis; John Gialelis. An IOTA based Distributed Sensor Node System. 2018. file:///C:/Users/eoussir/Downloads/AnIOTAbasedsensornodenetworkver11.pdf (Year: 2018).*
(Continued)

*Primary Examiner* — El Mehdi Oussir
(74) *Attorney, Agent, or Firm* — Fish & Richardson P.C.

(57) ABSTRACT

Embodiments of the present specification disclose a resource sharing method, apparatus, and device, where the method includes: obtaining, by a first blockchain node, a resource from a second blockchain node; performing, by the first blockchain node, a sharing operation to share the resource with one or more user terminals; generating, by the first blockchain node, sharing information related to the sharing operation; and broadcasting, by the first blockchain node, the sharing information to a blockchain network associated with the first blockchain node and the second blockchain node.

12 Claims, 7 Drawing Sheets

601

Determine sharing information about a resource with at least one blockchain node, where the blockchain node includes one of a first blockchain node and a second blockchain node, the first blockchain node is a sharing blockchain node of the resource, and the second blockchain node is a source blockchain node of the resource

603

Send the sharing information to a blockchain network including the first blockchain node and the second blockchain node (51) Int. Cl.
  *G06Q 20/32* (2012.01)
  *H04L 9/32* (2006.01)
  *H04L 9/00* (2022.01)
  *G06Q 20/14* (2012.01)

(52) U.S. Cl.
  CPC ......... *G06Q 20/389* (2013.01); *G06Q 20/145* (2013.01); *G06Q 2220/00* (2013.01); *H04L 9/3297* (2013.01); *H04L 9/50* (2022.05)

(56) References Cited

U.S. PATENT DOCUMENTS

| | | | | |
|---|---|---|---|---|
| 8,596,528 | B2* | 12/2013 | Fernandes | G06Q 20/223 |
| | | | | 235/380 |
| 8,972,296 | B2* | 3/2015 | Govindarajan | G06Q 20/3224 |
| | | | | 705/39 |
| 9,134,994 | B2* | 9/2015 | Patel | G06Q 20/322 |
| 9,256,873 | B2* | 2/2016 | Patel | G06Q 20/38 |
| 9,356,819 | B2* | 5/2016 | Bleecher Snyder | |
| | | | | G06Q 30/0261 |
| 9,582,793 | B2* | 2/2017 | Bostwick | G06Q 20/20 |
| 9,659,296 | B2* | 5/2017 | Patel | G06Q 20/322 |
| 9,875,473 | B2* | 1/2018 | Patel | G06Q 20/326 |
| 9,924,309 | B2* | 3/2018 | Lipman | G06Q 30/0251 |
| 10,019,703 | B2* | 7/2018 | Weksler | G06Q 20/3278 |
| 10,445,754 | B2* | 10/2019 | Snider | G06Q 20/3224 |
| 10,644,936 | B2* | 5/2020 | Todd | H04L 47/70 |
| 11,132,707 | B2* | 9/2021 | Johnson | H04L 9/0643 |
| 11,144,411 | B2 | 10/2021 | Liao | |
| 2008/0167991 | A1* | 7/2008 | Carlson | G06Q 30/0215 |
| | | | | 705/50 |
| 2008/0183480 | A1* | 7/2008 | Carlson | H04M 15/00 |
| | | | | 705/1.1 |
| 2008/0201226 | A1* | 8/2008 | Carlson | G06Q 30/0225 |
| | | | | 705/14.26 |
| 2009/0119190 | A1* | 5/2009 | Realini | G06Q 20/04 |
| | | | | 705/30 |
| 2013/0159081 | A1* | 6/2013 | Shastry | G06Q 20/384 |
| | | | | 705/14.23 |
| 2014/0040028 | A1* | 2/2014 | King | G06Q 30/0255 |
| | | | | 705/14.53 |
| 2014/0108252 | A1* | 4/2014 | Itwaru | G06Q 20/3276 |
| | | | | 705/44 |
| 2015/0269624 | A1* | 9/2015 | Cheng | G06Q 30/0267 |
| | | | | 705/14.58 |
| 2016/0203522 | A1* | 7/2016 | Shiffert | H04L 67/104 |
| | | | | 705/14.58 |
| 2016/0217532 | A1* | 7/2016 | Slavin | G06Q 30/0276 |
| 2017/0017958 | A1* | 1/2017 | Scott | G06Q 20/36 |
| 2017/0048217 | A1 | 2/2017 | Biggs et al. | |
| 2017/0083907 | A1* | 3/2017 | McDonough | G06Q 20/3829 |
| 2017/0085545 | A1* | 3/2017 | Lohe | G06Q 20/065 |
| 2017/0085555 | A1* | 3/2017 | Bisikalo | H04L 9/3236 |
| 2017/0091756 | A1* | 3/2017 | Stern | G06Q 20/367 |
| 2017/0169363 | A1* | 6/2017 | Salmasi | G06Q 20/322 |
| 2017/0228731 | A1* | 8/2017 | Sheng | G06Q 20/401 |
| 2017/0244707 | A1 | 8/2017 | Johnsrud et al. | |
| 2018/0025365 | A1* | 1/2018 | Wilkinson | G06Q 30/0201 |
| | | | | 705/7.29 |
| 2018/0039942 | A1 | 2/2018 | Rogers et al. | |
| 2018/0191503 | A1* | 7/2018 | Alwar | H04L 9/0637 |
| 2018/0211522 | A1 | 7/2018 | Furuichi et al. | |
| 2018/0225717 | A1* | 8/2018 | Storti | H04H 60/48 |
| 2018/0253464 | A1 | 9/2018 | Kohli et al. | |
| 2018/0268617 | A1* | 9/2018 | Bruce | G08G 1/146 |
| 2019/0109713 | A1* | 4/2019 | Clark | G06F 16/182 |
| 2019/0213048 | A1* | 7/2019 | Mason | H04L 67/32 |
| 2019/0349426 | A1* | 11/2019 | Smith | H04L 61/4505 |
| 2020/0143490 | A1* | 5/2020 | Lucidarme | G06F 16/211 |
| 2021/0233192 | A1* | 7/2021 | Manamohan | G06F 16/2255 |
| 2021/0397720 | A1* | 12/2021 | Wang | G06F 21/64 |

FOREIGN PATENT DOCUMENTS

| | | | |
|---|---|---|---|
| CN | 107480475 | | 12/2017 |
| CN | 107566337 | | 1/2018 |
| CN | 108322465 | | 7/2018 |
| CN | 109345389 | | 2/2019 |
| CN | 110648225 A * | | 1/2020 |
| CN | 107862548 | | 3/2020 |
| CN | 109615515 B * | | 8/2021 ............ G06Q 20/10 |
| KR | 20180029084 A * | | 8/2016 |
| KR | 20180103984 A * | | 3/2017 |
| KR | 20200048722 A * | | 5/2020 |
| KR | 102296907 B1 * | | 9/2021 |
| TW | 201801003 | | 1/2018 |
| TW | M561279 | | 6/2018 |
| WO | WO-2015031671 A1 * | | 3/2015 ......... G06Q 30/0251 |
| WO | WO-2019061983 A1 * | | 4/2019 .......... H04L 9/3239 |
| WO | WO 2020042805 | | 3/2020 |

OTHER PUBLICATIONS

Privacy Management in Social Internet of Vehicles: Review, Challenges and Blockchain Based Solutions https//ieeexplore.ieee.org/stamp/stamp.jsp?arnumber=8735700 (Year: 2019).*

D. Eckhoff and I. Wagner, "Privacy in the Smart City—Applications, Technologies, Challenges, and Solutions," in IEEE Communications Surveys & Tutorials, vol. 20, No. 1, pp. 489-516, Firstquarter 201. https://ieeexplore.ieee.org/document/8025782?source=IQplus (Year: 2018).*

Claudio Bettini, Daniele Riboni, Privacy protection in pervasive systems: State of the art and technical challenges, vol. 17, Part B, 2015, pp. 159-174, https://doi.org/10.1016/j.pmcj.2014.09.010. (Year: 2014).*

Alcarria et al. A Blockchain-Based Authorization System for Trustworthy Resource Monitoring and Trading in Smart Communities. https://tinyurl.com/mryy6f86 (Year: 2018).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2019/100694, dated Nov. 20, 2019, 9 pages (with partial English translation).

PCT International Preliminary Report on Patentability in International Application No. PCT/CN2019/100694, dated Mar. 23, 2021, 10 pages (with English translation).

* cited by examiner

| | ¥ | Time |
|---|---|---|
| Merchant 3B | | |
| Advertisements placed in merchant 3A | -m1 | T1 |
| Advertising for merchant G | m2 | T2 |
| In-store shopping of consumers | m3 | T3 |

FIG. 5

601 — Determine sharing information about a resource with at least one blockchain node, where the blockchain node includes one of a first blockchain node and a second blockchain node, the first blockchain node is a sharing blockchain node of the resource, and the second blockchain node is a source blockchain node of the resource 603 — Send the sharing information to a blockchain network including the first blockchain node and the second blockchain node

RESOURCE SHARING METHOD, APPARATUS, AND DEVICE

CROSS-REFERENCE TO RELATED APPLICATIONS

This application is a continuation of PCT Application No. PCT/CN2019/100694, filed on Aug. 15, 2019, which claims priority to Chinese Patent Application No. 201811113518.0, filed on Sep. 25, 2018, and each application is hereby incorporated by reference in its entirety.

TECHNICAL FIELD

Embodiments of the present specification relate to the field of computer technologies, and in particular, to resource sharing methods, apparatuses, and devices.

BACKGROUND

At present, displaying resources in an application or platform is one method to draw Internet traffic and spending. Typically, merchants can develop applications, platforms, or devices to display the resources owned. Or resources of several merchants are concentrated on a unified platform, and users can select resources they need or pay attention to.

However, a more efficient resource sharing method is needed in the industry.

SUMMARY

In view of this, embodiments of the present specification provide more efficient resource sharing methods, apparatuses, and devices.

The following technical solutions are used in some embodiments of the present specification.

Some embodiments of the present application provide a resource sharing method, including: sharing, by a first blockchain node, a resource from a second blockchain node; determining sharing information about the resource from the second blockchain node; and sending the sharing information to a blockchain network including the first blockchain node and the second blockchain node.

Some embodiments of the present application further provide a resource sharing method, including: determining, by a second blockchain node, sharing information about a resource from the second blockchain node by at least one first blockchain node; and sending the sharing information to a blockchain network including the first blockchain node and the second blockchain node.

Some embodiments of the present application further provide a resource sharing method, including: determining sharing information about a resource with at least one blockchain node, where the blockchain node includes one of a first blockchain node and a second blockchain node, the first blockchain node is a sharing blockchain node of the resource, and the second blockchain node is a source blockchain node of the resource; and sending the sharing information to a blockchain network including the first blockchain node and the second blockchain node.

Some embodiments of the present application further provide a resource sharing apparatus, including: a sharing module, configured to share a resource from a second blockchain node; a determining module, configured to determine sharing information about the resource from the second blockchain node; and a sending module, configured to send the sharing information to a blockchain network including a first blockchain node and the second blockchain node.

Some embodiments of the present application further provide a resource sharing apparatus, including: a determining module, configured to determine sharing information of a resource from a second blockchain node by at least one first blockchain node; and a sending module, configured to send the sharing information to a blockchain network including the first blockchain node and the second blockchain node.

Some embodiments of the present application further provide a resource sharing apparatus, including: a determining module, configured to determine sharing information about a resource with at least one blockchain node, where the blockchain node includes one of a first blockchain node and a second blockchain node, the first blockchain node is a sharing blockchain node of the resource, and the second blockchain node is a source blockchain node of the resource; and a sending module, configured to send the sharing information to a blockchain network including the first blockchain node and the second blockchain node.

Some embodiments of the present specification further provide an electronic device, including at least one processor and a memory, where the memory stores a program, which is configured to be executed by the at least one processor to perform the following steps: sharing a resource from a second blockchain node; determining sharing information about the resource from the second blockchain node; and sending the sharing information to a blockchain network including the first blockchain node and the second blockchain node.

Some embodiments of the present specification further provide an electronic device, including at least one processor and a memory, where the memory stores a program, which is configured to be executed by the at least one processor to perform the following steps: determining sharing information of a resource from a second blockchain node by at least one first blockchain node; and sending the sharing information to a blockchain network including the first blockchain node and the second blockchain node.

Some embodiments of the present specification further provide an electronic device, including at least one processor and a memory, where the memory stores a program, which is configured to be executed by the at least one processor to perform the following steps: determining sharing information about a resource with at least one blockchain node, where the blockchain node includes one of a first blockchain node and a second blockchain node, the first blockchain node is a sharing blockchain node of the resource, and the second blockchain node is a source blockchain node of the resource; and sending the sharing information to a blockchain network including the first blockchain node and the second blockchain node.

The at least one technical solution used in some embodiments of the present specification can achieve the following beneficial effects: Sharing information about a resource with at least one blockchain node is determined, where the blockchain node includes one of a first blockchain node and a second blockchain node, the first blockchain node is a sharing blockchain node of the resource, and the second blockchain node is a source blockchain node of the resource; and the sharing information is sent to a blockchain network including the first blockchain node and the second blockchain node. As such, resource sharing can be implemented among blockchain nodes, so resource sharing is no longer limited to an individual application, a platform, or a device.

Each blockchain node has more choices to share its own resource, thereby effectively improving resource sharing efficiency. In addition, in some embodiments of the present specification, by using a blockchain mode, resource sharing is implemented while improving security, reliability, and tamper-resistance of the resource and the sharing information.

BRIEF DESCRIPTION OF DRAWINGS

The accompanying drawings described here are used to provide further understanding of the embodiments of the present specification, and constitute a part of the embodiments of the present specification. The example embodiments of the present specification and descriptions thereof are used to explain the present application, and are not intended to constitute an undue limitation of the present application. In the accompanying drawings.

DESCRIPTION OF EMBODIMENTS

By analyzing the existing technology, it is found that an existing resource sharing method relies on a device, an application, or a platform, or relies on a unified platform to publish a resource on the unified platform for sharing, which limits effective resource propagation and reduces resource sharing efficiency.

Embodiments of the present specification provide resource sharing methods, apparatuses, and devices, where the method includes: determining sharing information about a resource with at least one blockchain node, where the blockchain node includes one of a first blockchain node and a second blockchain node, the first blockchain node is a sharing blockchain node of the resource, and the second blockchain node is a source blockchain node of the resource; and sending the sharing information to a blockchain network including the first blockchain node and the second blockchain node. As such, when the first blockchain node shares the resource from the second blockchain node, the first blockchain node can determine sharing information about the resource from the second blockchain node, and the second blockchain can also determine sharing information about the resource from the second blockchain node provided by at least one first blockchain node. As such, resource sharing can be implemented among blockchain nodes, so resource sharing is no longer limited to an individual application, a platform, or a device. Each blockchain node has more choices to share its own resource, thereby effectively improving resource sharing efficiency.

It is worthwhile to note that the blockchain essentially uses a decentralized distributed data storage method based on point-to-point transmission, which can implement resource sharing among the blockchain nodes in some embodiments of the present specification. In addition, the blockchain is a new application mode based on computer technologies such as a consensus mechanism and an encryption algorithm. This can help establish trust and obtain interests among different blockchain nodes that share resources, and improve security, reliability, and tamper-resistance of sharing information.

To make the objectives, technical solutions, and advantages of the present application clearer, the following clearly and comprehensively describes the technical solutions of the present application with reference to specific embodiments and accompanying drawings of the present specification. Clearly, the described embodiments are merely some but not all of the embodiments of the present specification. All other embodiments obtained by a person of ordinary skill in the art based on the embodiments of the present specification without creative efforts shall fall within the protection scope of the present application.

The technical solutions provided in some embodiments of the present specification are described in detail below with reference to the accompanying drawings.

Figure 1:
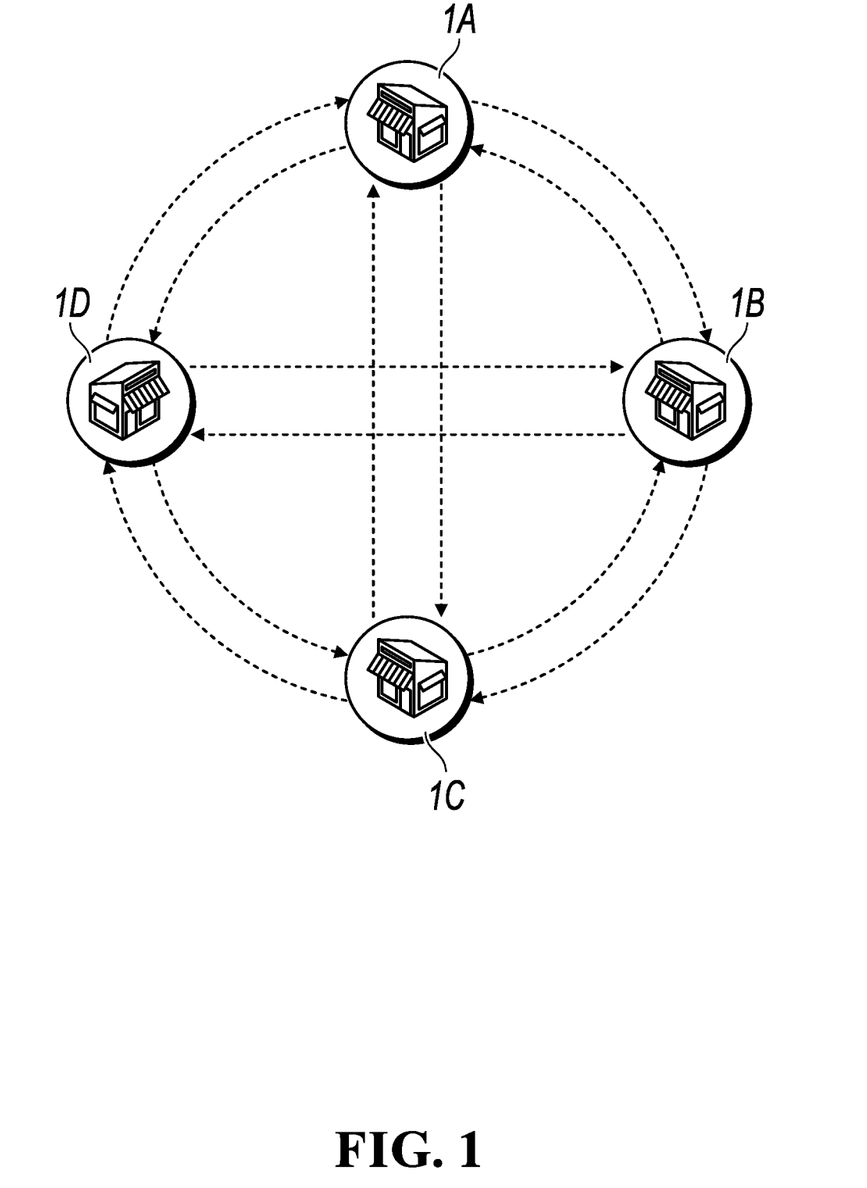
FIG. 1 is a schematic structural diagram illustrating a resource sharing system, according to an embodiment of the present specification.

FIG. 1 is a schematic structural diagram illustrating a resource sharing system, according to an embodiment of the present specification.

The resource sharing system is a blockchain network established based on several blockchain nodes, and can include blockchain nodes 1A, 1B, 1C, and 1D as shown in the figure. These blockchain nodes can respectively correspond to different merchants or other types of entities. The blockchain network can include four blockchain nodes, or less or more blockchain nodes, as shown in the figure, which is not specifically limited here.

Merchant 1A, merchant 1B, merchant 1C, and merchant 1D can share resources. Arrows in FIG. 1 are used to indicate resource sharing relationships. Each merchant can share resources with other merchants, and each merchant can randomly select a resource sharing object.

It is worthwhile to note that the resource can be understood as a variety of information resources that can be transmitted by using a network, and can specifically include: a wireless network signal, a picture, a text, an audio, a video, etc. Traffic is generated in a transmission process of the resource. Therefore, a payment amount can be obtained among blockchain nodes based on traffic generated by sharing, so as to implement sharing of the traffic and the resource. The information resource can include an advertisement, promotion information, activity information, etc. Details are omitted here for simplicity again.

In this case, a hardware device or an application of each merchant can provide an interface of the resource sharing system, thereby improving utilization of the hardware device or the application and further improving resource propagation efficiency.

Figure 2:
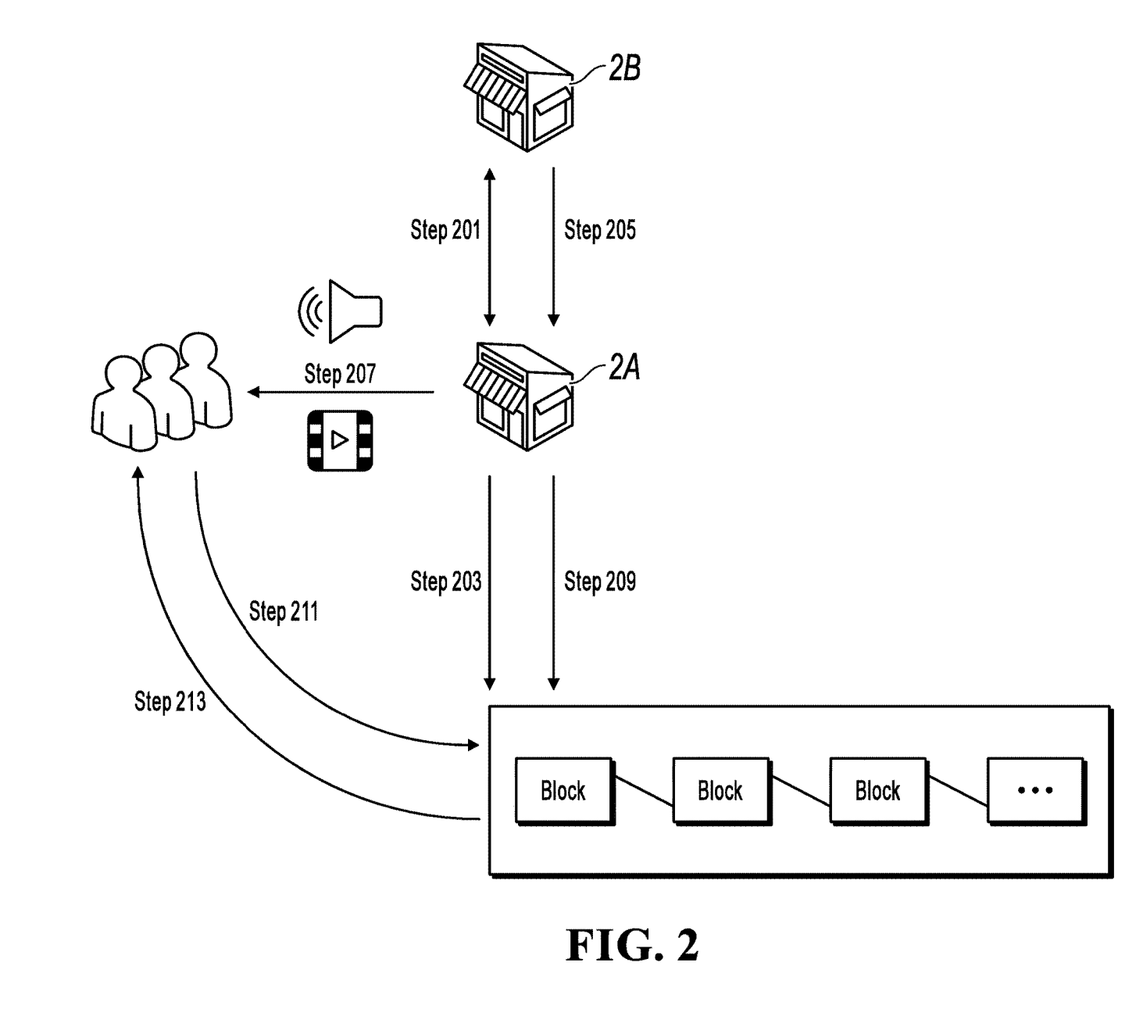
FIG. 2 is a schematic structural diagram illustrating an application instance of a resource sharing system, according to an embodiment of the present specification.

FIG. 2 is a schematic structural diagram illustrating an application instance of a resource sharing system, according to an embodiment of the present specification.

Merchant 2A and merchant 2B are two blockchain nodes in a blockchain network, and can respectively correspond to a first blockchain node and a second blockchain node.

Step 201: Determine a fee sharing agreement between merchant 2A and merchant 2B, where the fee sharing agreement is used to agree on a resource sharing charging rule, so as to implement a resource sharing mechanism among blockchain nodes.

Step 203: Merchant 2A stores the fee sharing agreement in the blockchain network, where the fee sharing agreement can be specifically stored in each blockchain node, or can be stored in a server.

In a resource sharing phase:

Step 205: Merchant 2B has a resource and has a resource sharing need. Merchant 2B can first make prepayment for the resource sharing need, and can specifically pay merchant 2A, for example, make payment to an account of hardware or a server of merchant 2A. In some embodiments of the present specification, merchant 2B can directly upload the payment to the blockchain network to perform distributed storage to form a private blockchain freely controlled by the merchant.

Step 207: Merchant 2A can provide a resource sharing service after receiving the prepayment; specifically, can share a resource from merchant 2B by playing a video or audio, and determine a sharing parameter value. In some embodiments of the present specification, merchant 2A can set a sensing hardware. When the sensing hardware senses that a user enters a predetermined area, such as a store of merchant 2A, it is determined to perform step 207, and perform resource content (such as advertisement) display or broadcasting.

Step 209: Merchant 2A sends the sharing parameter value of the sharing process to the blockchain network as a part of the sharing information, so as to implement traffic sharing among business circles in the blockchain nodes. In this case, the sharing parameter value can include but is not limited to: identifiers of blockchain nodes corresponding to a resource sharing relationship, sharing time, times of sharing within a specified time period, and payment information corresponding to sharing of the resource from the second blockchain node.

To this point, resource sharing and payment are completed between the two blockchain nodes of merchants 2A and 2B.

After merchant 2A shares the resource, the user can interact with merchant 2B on the hardware device of merchant 2A based on the shared resource. If a transaction is made, step 211 is performed.

The transaction information with merchant 2A is sent to the blockchain network, so a relationship chain between the user and the merchant can be implemented.

Step 213: Merchant 2B can return a partial cashback of the current transaction to the user or merchant 2A.

The transaction information includes but is not limited to payment, a click/purchase behavior, dialogue information, a semantic dimension, a similarity feature of a personal label, etc. of the user. The transaction information is stored in the blockchain by using an encryption algorithm and with a timestamp added, and the user can choose whether to disclose the transaction information, so as to form a personal blockchain feature where information security is ensured. In this case, the user can complete the current behavior by using the hardware device of merchant 2B.

In some embodiments of the present specification, merchant 2B can return a partial income of the current transaction as a cashback to the user or merchant 2A. In this case, the payment can be made by using token coins prepaid by merchant 2B to the blockchain network, or can be directly made by merchant 2B, which is not specifically limited here.

By using the system shown in FIG. 2, a good resource sharing mechanism can be formed between each blockchain node and the user.

Figure 3:
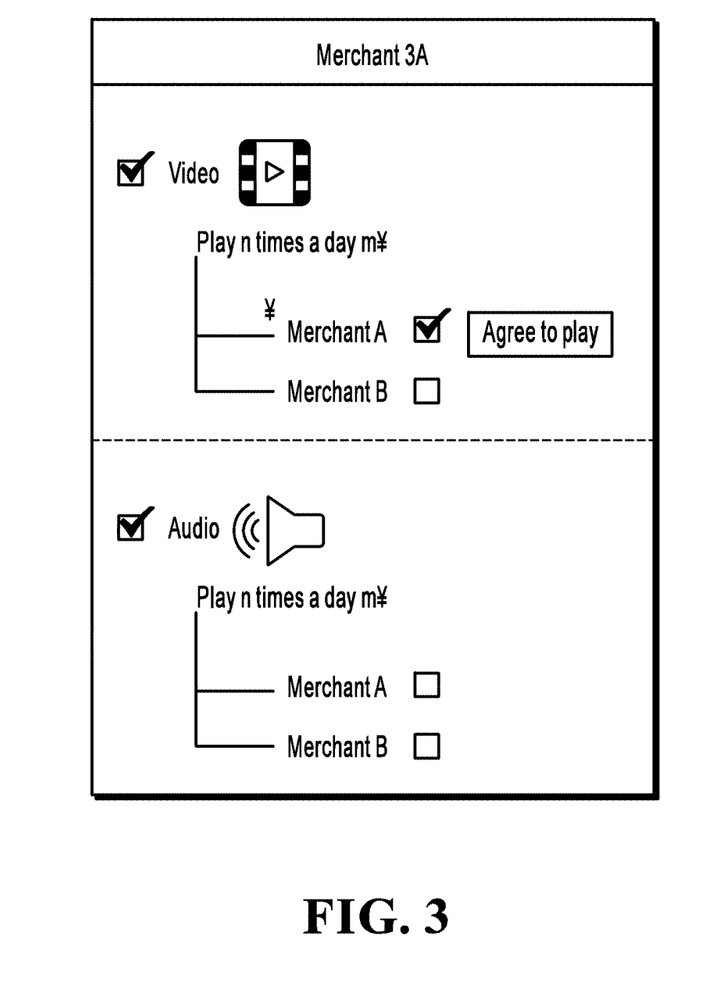
FIG. 3 is a schematic interface diagram illustrating a first blockchain node in a resource sharing system, according to an embodiment of the present specification.

FIG. 3 is a schematic interface diagram illustrating a first blockchain node in a resource sharing system, according to an embodiment of the present specification.

By using the interface of the first blockchain node (merchant 3A), a resource sharing form can be set, and can include but is not limited to multi-dimensional setting such as video/audio/text/picture. Further, resource sharing service information is determined and sent, so as to implement traffic sales for hardware in the store. Here, a multi-dimensional play method, play frequency (for example, played n times per day), a play time, payment for sharing (my), a play distance, etc. can be selected.

Figure 4:
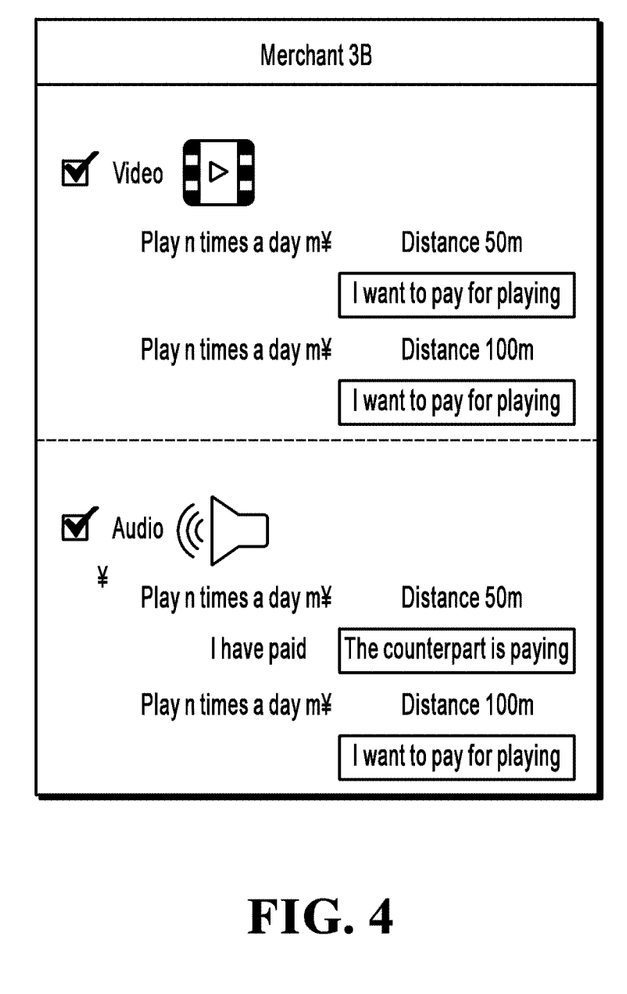
FIG. 4 is a schematic interface diagram illustrating a second blockchain node in a resource sharing system, according to an embodiment of the present specification.

FIG. 4 is a schematic interface diagram illustrating a second blockchain node in a resource sharing system, according to an embodiment of the present specification.

Through the interface of the second blockchain node (merchant 3B), the nearby geographical locations/industries/upstream and downstream supply chain information and various devices that can be used for broadcasting/displaying can be queried. For example, it is queried that a merchant within a distance of 50 m can play a resource by using video and audio, and a merchant within a distance of 100 m can play a resource by using video and audio. After merchant 3A (as shown in FIG. 3) is selected, certain payment is made to the blockchain network or is directly made to the selected merchant 3A, and the selected merchant 3A plays the advertisement of merchant 3B.

Figure 5:
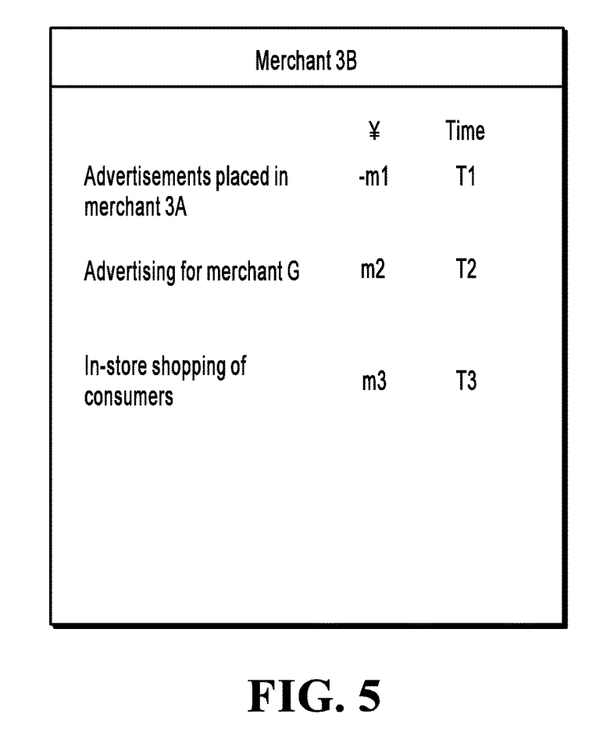
FIG. 5 is a schematic interface diagram illustrating a second blockchain node in a resource sharing system, according to an embodiment of the present specification.

FIG. 5 is a schematic interface diagram illustrating a second blockchain node in a resource sharing system, according to an embodiment of the present specification.

The payment information broadcasted by the second blockchain node (merchant 3B) can be specifically: payment m1 and payment time T1 for advertising on merchant 3A; payment m2 and payment time T2 for advertising for merchant G; and payment m3 and payment time T3 for in-store shopping of the user. This is not specifically limited here.

Content and forms shown in FIG. 3, FIG. 4, and FIG. 5 are only application instances, and do not constitute a limitation on the protection scope of the embodiments of the present specification.

Figure 6:
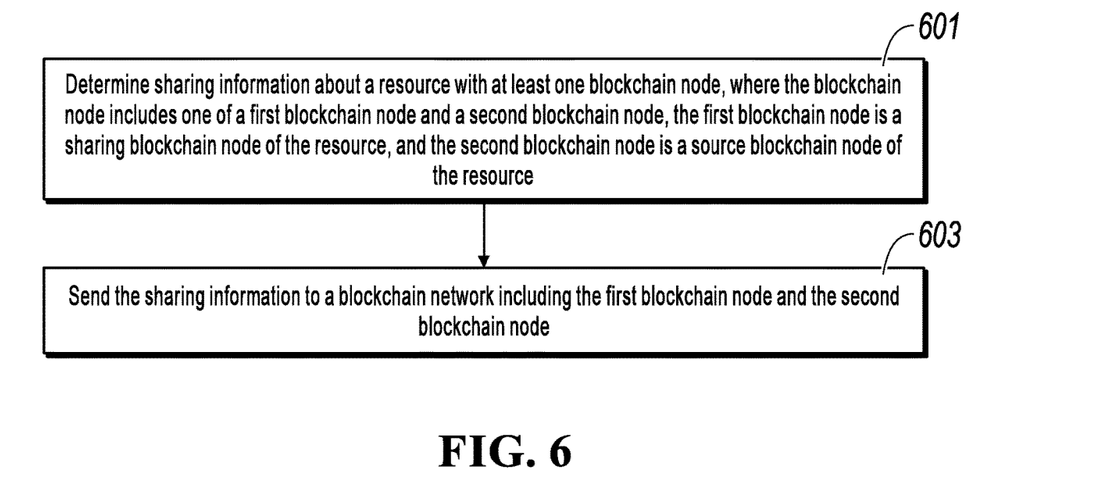
FIG. 6 is a flowchart illustrating a resource sharing method, according to an embodiment of the present specification.

FIG. 6 is a flowchart illustrating a resource sharing method, according to an embodiment of the present specification. The resource sharing method is described as follows: The resource sharing method described in some embodiments of the present specification can be executed by any blockchain node.

Step 601: Determine sharing information about a resource with at least one blockchain node, where the blockchain node includes one of a first blockchain node and a second blockchain node, the first blockchain node is a sharing blockchain node of the resource, and the second blockchain node is a source blockchain node of the resource.

Based on resource sharing paths, the first blockchain node can share resources from other blockchain nodes, and the second blockchain node can provide resources. Therefore, step 601 can be executed by the first blockchain node. In this case, determining sharing information about a resource with at least one blockchain node can include:

The first blockchain node shares the resource from the second blockchain node, and determines the sharing information based on a sharing parameter value.

If step 601 is executed by the second blockchain node, determining sharing information about a resource with at least one blockchain node can include:

When the second blockchain node shares the resource from the second blockchain node on the first blockchain node, the second blockchain node determines the sharing information based on the sharing parameter value.

In a specific application scenario, the blockchain node can be corresponding to an online merchant or a brick-and-mortar merchant. For example, merchants in a certain geographical area or several online merchants can form a blockchain network based on a consensus mechanism. If merchants in a certain geographical area form a blockchain network, a merchant can display resources on hardware devices of nearby merchants, to improve resource utilization of the merchant and publicity effect. Similarly, a merchant can obtain payment by sharing resources of nearby merchants. If several merchants form a blockchain network, the merchants can spread and share resources online.

In this case, the blockchain nodes can be merchants that compete with each other, or can be merchants that do not operate the same businesses, or the blockchain nodes can be organizations that provide only a resource sharing service (such as an advertisement company). A specific application scenario can be an offline scenario, or can be an online scenario, which is not specifically limited here.

In some embodiments of the present specification, determining sharing information about a resource with at least one blockchain node can include: determining at least one of the following sharing information about a resource with at least one blockchain node: a sharing parameter value; operation information of a user on a shared resource; and a sharing charging rule.

The sharing parameter value can include: a resource sharing form, an attribute, identifiers of blockchain nodes in a resource sharing relationship, a sharing time, the times of sharing or sharing frequency within a specified time period, payment information generated for the shared resource, etc. This is not specifically limited here.

The resource sharing form can include one or more of a text, a picture, a video, an audio, or a wireless network signal, and is not specifically limited here. In terms of resource embodiment, the resource can include an advertisement or a wireless network signal, and the advertisement can be the form of text, picture, video, or audio. The wireless network signal can be a wireless network Wi-Fi signal.

The operation information of the user on the shared resource can be that the user directly performs an operation on the shared resource, for example, clicks to watch a video, opens a store link, or clicks to enter a source merchant interface of the resource, which is not specifically limited here.

The sharing charging rule can provide a rule for calculating payment for resource sharing. The sharing charging rule can be agreed among at least two blockchain nodes, and can be negotiated by some blockchain nodes or all blockchain nodes in the blockchain network.

Step 603: Send the sharing information to a blockchain network including the first blockchain node and the second blockchain node.

In some embodiments of the present specification, the sharing information is stored in the blockchain network, and can be distributed in each blockchain node. Specifically, sending sharing information to a blockchain network including the first blockchain node and the second blockchain node can include: sending a sharing information consensus request to request a consensus node to perform consensus authentication on the sharing information; and if the consensus authentication succeeds, sending the sharing information to each blockchain node.

Referring to the blockchain principle, the sharing information is transparent to each blockchain node, and a ledger that includes the sharing information is distributed at each blockchain node locally. Each blockchain node can determine, by querying the sharing information, a merchant that provides a resource sharing service, or can recommend, by querying the sharing information, a resource sharing service to another blockchain node, so as to effectively use an idle hardware device or an application platform. In addition, the sharing information is stored on each blockchain node as a distributed ledger, which cannot be modified and facilitates trust establishment among merchants.

Based on the resource sharing method described in some embodiments of the present specification, resource sharing can be implemented among blockchain nodes, and the resource sharing mechanism can be spread to applications, platforms, or devices of more blockchain nodes. The blockchain node can have more choices to share its resources, and the blockchain node can also provide a resource sharing service to improve utilization of a device, an application, or a platform. This can effectively improve resource sharing efficiency. In the resource sharing solution described in some embodiments of the present specification, a blockchain mode is used to implement resource sharing, and further improve security, reliability, and tamper-resistance of the resource and the sharing information.

Figure 7:
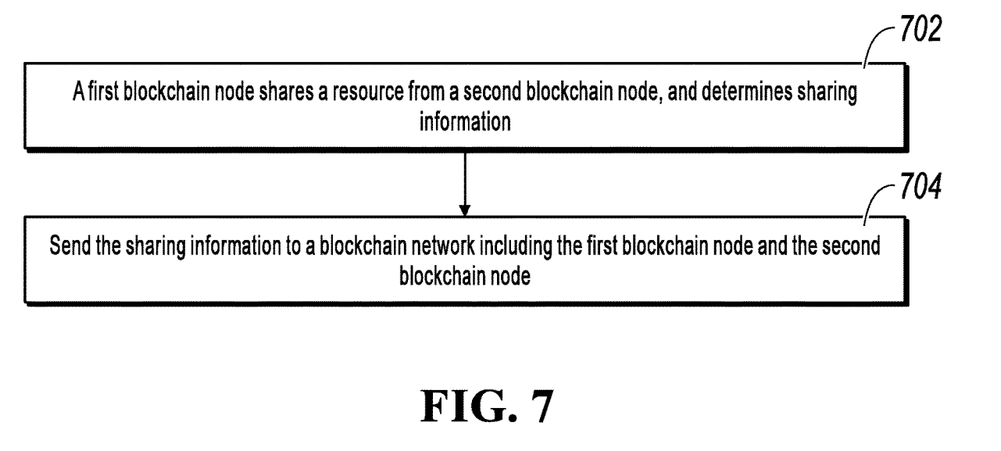
FIG. 7 is a flowchart illustrating a resource sharing method, according to an embodiment of the present specification.

FIG. 7 is a schematic flowchart illustrating a resource sharing method, according to an embodiment of the present specification. The resource sharing method is described as follows: This embodiment of the present specification can be executed by a first blockchain node that provides a resource sharing service. For a type of the first blockchain node, refer to the previous description. Details are omitted here for simplicity.

Step 702: The first blockchain node shares a resource from a second blockchain node, and determines sharing information.

In some embodiments of the present specification, sharing, by a first blockchain node, a resource from a second blockchain node can include: sharing the resource from the second blockchain node to generate a sharing parameter value; and determining the sharing information based on the sharing parameter value.

Specifically, the first blockchain node can share the resource from the second blockchain node by using a hardware device or an application of the first blockchain node, and the hardware device can be disposed in a merchant corresponding to the first blockchain node, so as to provide an operation interface, where the operation interface is used to share the resource from the second blockchain node.

In addition, the application (APP) can be developed by the first blockchain node, and runs on a terminal device. As such, the first blockchain node can share the resource from the second blockchain node at a client device running the application.

For the understanding of the resource, reference can be made to the content corresponding to FIG. 1. In this case, the resource from the second blockchain node can include but is not limited to at least one of the following information: advertisement information of the second blockchain node; and a wireless network signal transmitted by the second blockchain node.

If the resource is the advertisement information of the second blockchain node, the advertisement information can be shared by using a video, an audio, a text, or a picture. If the resource is the wireless network signal transmitted by the second blockchain node, sharing can be implemented by connecting to the wireless network signal or displaying an account and a password of the wireless network signal.

In some embodiments of the present specification, sharing the resource from the second blockchain node to generate a sharing parameter value can include: generating the sharing parameter value before sharing the resource, so the resource can be shared based on the sharing parameter value; or generating the sharing parameter value in real time when sharing the resource; or generating the sharing parameter value after sharing the resource.

Specifically, generating the sharing parameter value can include: generating at least one of the following sharing parameter values: identifiers of blockchain nodes in a sharing relationship of the resource; sharing time; times of sharing within a specified time period; and payment information for sharing the resource from the second blockchain node.

In some embodiments of the present specification, sharing the resource from the second blockchain node can include: proactively sharing the resource from the second blockchain node; and sharing the resource from the second blockchain node when a predetermined event is detected.

The predetermined event can be detected in at least one of the following methods: detecting that a user enters a predetermined area; receiving a sharing request of the second blockchain node for sharing the resource; and receiving a query request of a user for querying the resource from the second blockchain node.

In some embodiments of the present specification, referring to the previous content shown in FIG. 2, the first blockchain node can be provided with a sensing device. In this case, detecting that a user enters a predetermined area can include: detecting that the user enters the sensing range of the hardware device of the first blockchain node, which includes but is not limited to entering a store or being about to enter a store. In this case, resource sharing can be started, for example, playing a video or an audio.

In some embodiments of the present specification, receiving the resource sharing request of the second blockchain node can refer to that the device or the application corresponding to the first blockchain node receives the resource sharing request of the second blockchain node. The sharing request can include the sharing parameter value and payment information for sharing the resource. As such, receiving the resource sharing request of the second blockchain node can include: receiving the payment information of the second blockchain node for sharing the resource. The payment information is equivalent to prepayment information for sharing the resource. After receiving the payment information, the first blockchain node can immediately share the resource. The payment information can include a token coin of a payment amount or a payment amount, a payer identifier, a payee identifier, a sharing parameter value, etc. This is not specifically limited here.

In some embodiments of the present specification, receiving payment information of the second blockchain node for sharing the resource can include: directly receiving the payment information for sharing the resource from the second blockchain node.

In another application scenario, receiving payment information of the second blockchain node for sharing the resource can include: sending resource sharing service information; and receiving the payment information of the second blockchain node that is based on the resource sharing service information.

In a specific scenario, reference can be made to the previous content shown in FIG. 3 and FIG. 4. The first blockchain node publishes video-based resource sharing service information, and the resource service information can be broadcasted to other blockchain nodes. As such, when detecting the resource service information, the second blockchain node can make payment to the first blockchain node, and the payment is used as the payment for sharing the resource or referred to as prepayment.

In this case, the first blockchain node proactively seeks a sharing opportunity, and starts resource sharing when receiving the payment information for sharing the current resource.

In some embodiments of the present specification, sharing the resource from the second blockchain node when receiving a query request from the user for the resource from the second blockchain node can specifically include: determining, based on the query request, at least one second blockchain node that satisfies a query condition; and sharing a resource from the at least one second blockchain node.

In this case, the user initiates the query request by using the hardware device or the application of the first blockchain node. The first blockchain node identifies the query request, determines a query condition, and recommends, to the user, a resource of the second blockchain node that satisfies the query condition. The query condition can include needed product information, service information, the distance to the current user, etc. For example, if the query request initiated by the user is "I want to drink coffee", the query condition is "drink coffee". As such, the first blockchain node recommends, to the user, a resource of the second blockchain node that can provide a coffee service.

In a specific application, the resource shared by the first blockchain node can include location information of the second blockchain node, the distance to the current location, advertisement information, promotion information, etc. This is not specifically limited here.

In some embodiments of the present specification, determining, based on the query request, at least one second blockchain node that satisfies a query condition can include: querying the blockchain network based on the query request, and determining at least one second blockchain node that satisfies the query condition.

In a specific application, identification information of each blockchain node includes available resource information, and can be stored in the blockchain network. As such, the second blockchain node that satisfies the query condition can be determined by querying the blockchain network. Specifically, the first blockchain node can determine, by using historical sharing information stored by the first blockchain node, the second blockchain node that satisfies the query condition. The first blockchain node can directly query the second blockchain node locally, and does not need to be connected to internet to determine the second blockchain node. Therefore, query efficiency is high.

In some embodiments of the present specification, the first blockchain node can provide an operation interface for the user to perform an operation on the shared resource by using the operation interface. In this case, performing step 702 that the first blockchain node shares the resource from the second blockchain node includes: sharing the resource from the second blockchain node to generate a sharing parameter value; and determining operation information of a user on the shared resource; and determining the sharing information based on at least one of the operation information and the sharing parameter value.

In some embodiments of the present specification, the first blockchain node can detect whether the shared resource is clicked or touched. If the triggering operation is detected, operation information of the user on the shared resource can be determined based on the operation. In a specific application scenario, the first blockchain node can provide an operation interface, so the user is allowed to perform an operation on the shared resource. As such, the operation information can be determined based on the operation behavior of the user on the shared resource. In this case, the sharing information of the resource from the second blockchain node can be determined based on the sharing parameter value and the operation information.

In some embodiments of the present specification, determining operation information of the user on the shared resource can include: determining at least one of the following operation information of the user on the shared resource: the quantity of operations on the shared resource within a specified time period; operation time on the shared resource; and payment information generated for the resource shared by the operation.

In some embodiments of the present specification, an operation performed by the user on the shared resource is a result of sharing the resource by the first blockchain node. Therefore, the first blockchain node can make payment for a traffic consumption request. In this case, the quantity of operations and the operation time can be the basis for calculating payment needed for this operation. As such, corresponding payment can be made for both the resource sharing and a subsequent user operation on the resource.

In a specific scenario, the quantity of operations on the shared resource within the specified time period can be the quantity of operations on a resource such as a shared video, audio, text, picture, or link within the specified time period. The operation time of the shared resource can be an operation time of each shared resource, and the operation time affects calculation of the sharing payment.

In some embodiments of the present specification, it can be further detected whether the user accesses the second blockchain node based on the shared resource. In this case, the resource shared by the first blockchain node can include an access address of the second blockchain node, so the user can access the page of the second blockchain node online. Determining operation information of the user on the shared resource can include: when it is detected that the user accesses the second blockchain node based on the shared resource, determining the operation information on the shared resource based on the access.

In an application instance, in the operation interface provided by the first blockchain node, if it is detected that a specified operation performed by the user on a link of the second blockchain node is a clicking operation, touching operation, or another operation, it can be determined that the user accesses the second blockchain node based on the shared resource.

Or when it is detected that the current interface of the first blockchain node jumps to the second blockchain node, it can be determined that the user accesses the second blockchain node based on the shared resource.

Step 704: Send the sharing information to a blockchain network including the first blockchain node and the second blockchain node.

Specifically, sending sharing information to a blockchain network including the first blockchain node and the second blockchain node can include: sending a consensus request for the sharing information to at least one blockchain node; and if consensus authentication succeeds, sending the sharing information to each blockchain node, where the sharing information is stored in different blockchain nodes.

According to the resource sharing method described in some embodiments of the present specification, resource sharing can be implemented among blockchain nodes, and the resource sharing is no longer limited to an individual application, platform, or device, and dependence on a platform is reduced. Each blockchain node can have more choices to share its resource, thereby effectively improving resource sharing efficiency. In the resource sharing solution described in some embodiments of the present specification, a blockchain mode is used to implement resource sharing, and further improve security, reliability, and tamper-resistance of the resource and the sharing information.

Figure 8:
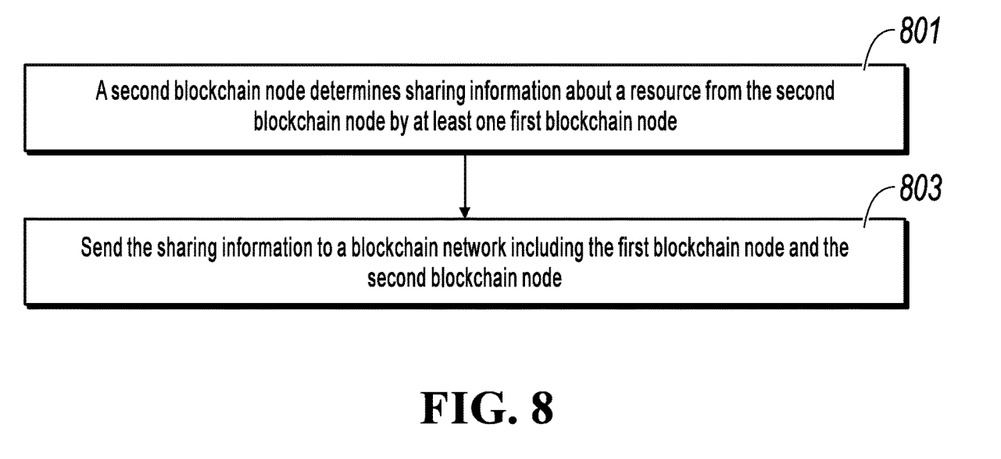
FIG. 8 is a flowchart illustrating a resource sharing method, according to an embodiment of the present specification.

FIG. 8 is a schematic flowchart illustrating a resource sharing method, according to an embodiment of the present specification. The method is described as follows: The resource sharing method described in some embodiments of the present specification and the resource sharing method shown in FIG. 3 are based on the same inventive concept. The method described in some embodiments of the present specification is executed by a second blockchain node that provides a resource for sharing.

Step 801: The second blockchain node determines sharing information about a resource from the second blockchain node by at least one first blockchain node.

In some embodiments of the present specification, before the second blockchain node determines information about sharing a published resource by at least one first blockchain node, the method can further include: sending a resource sharing request, where the resource sharing request is used to request the at least one first blockchain node to share the resource.

Sending a resource sharing request can include: broadcasting the resource sharing request; or sending the resource sharing request to the at least one first blockchain node that satisfies the predetermined condition.

For the former, the resource sharing request can be broadcasted to other blockchain nodes.

For the latter, before the resource sharing request is sent, the method can further include: querying the at least one first blockchain node that satisfies a predetermined condition; and sending a resource sharing request includes: sending the resource sharing request to the at least one first blockchain node that satisfies the predetermined condition.

As such, the second blockchain node can select a proper first blockchain node to share a resource of the second blockchain node. The predetermined condition can include a sharing price, a distance from the first blockchain node to the current location, a specific form of sharing, etc., which is not specifically limited here.

In some embodiments of the present specification, the resource sharing request can further include an identifier of the first blockchain node that can share a resource, a sharing parameter value, a resource type, payment information for sharing, etc.

Specifically, sending a resource sharing request includes: sending payment information for sharing the resource.

As such, when receiving the payment information, the first blockchain node can directly share the resource.

In some embodiments of the present specification, the payment information is prepayment of the shared resource, and the payment information of the shared resource can be determined based on the sharing charging rule. The payment for sharing can be agreed upon by the first blockchain node and the second blockchain node and uploaded to the blockchain network.

In some embodiments of the present specification, determining, by the second blockchain node, information about sharing a published resource by at least one first blockchain node can further include: when it is detected that a user accesses the second blockchain node by using the at least one first blockchain node, determining resource sharing information of the at least one first blockchain node based on the access.

This can be described with reference to the previous related content described on the side of the first blockchain node. Details are omitted here for simplicity.

In some embodiments of the present specification, detecting that a user accesses the second blockchain node by using the at least one first blockchain node includes: detecting an access duration of the user on the second blockchain node; and detecting transaction information between the user and the second blockchain node; and determining operation information for the shared resource based on the access includes: determining the operation information for the shared resource based on at least one of the access duration and the transaction information.

The duration of the user on the second blockchain node can be a duration of the user on the user interface of the second blockchain node, and a longer duration results in more traffic. As such, the transaction possibility increases.

The transaction information includes product information or service information purchased by the user, and corresponding payment information.

The resource sharing method described in some embodiments of the present specification can further include: determining cashback information for at least one of the first blockchain node and the user based on the transaction information; and determining resource sharing information of the at least one first blockchain node based on the access further includes: determining the resource sharing information of the at least one first blockchain node based on the cashback information.

The cashback information can be a consumption reward generated by the resource shared by the first blockchain node, or a cashback for the user. The cashback information for at least one of the first blockchain node and the user is determined based on the transaction information, and the current transaction amount or transaction profit can be processed based on a fee sharing agreement, to determine a cashback amount returned to the first blockchain node.

Step 803: Send the sharing information to a blockchain network including the first blockchain node and the second blockchain node.

In some embodiments of the present specification, the sharing information generated when the resource is shared can be sent by the first blockchain node to the blockchain node, or can be sent by the second blockchain node to the blockchain network.

According to the resource sharing method described in some embodiments of the present specification, resource sharing can be implemented among blockchain nodes, and the resource sharing is no longer limited to an individual application, platform, or device, and dependence on a platform is reduced. Each blockchain node can have more choices to share its resource, thereby effectively improving resource sharing efficiency. In the resource sharing solution described in some embodiments of the present specification, a blockchain mode is used to implement resource sharing, and further improve security, reliability, and tamper-resistance of the resource and the sharing information.

Figure 9:
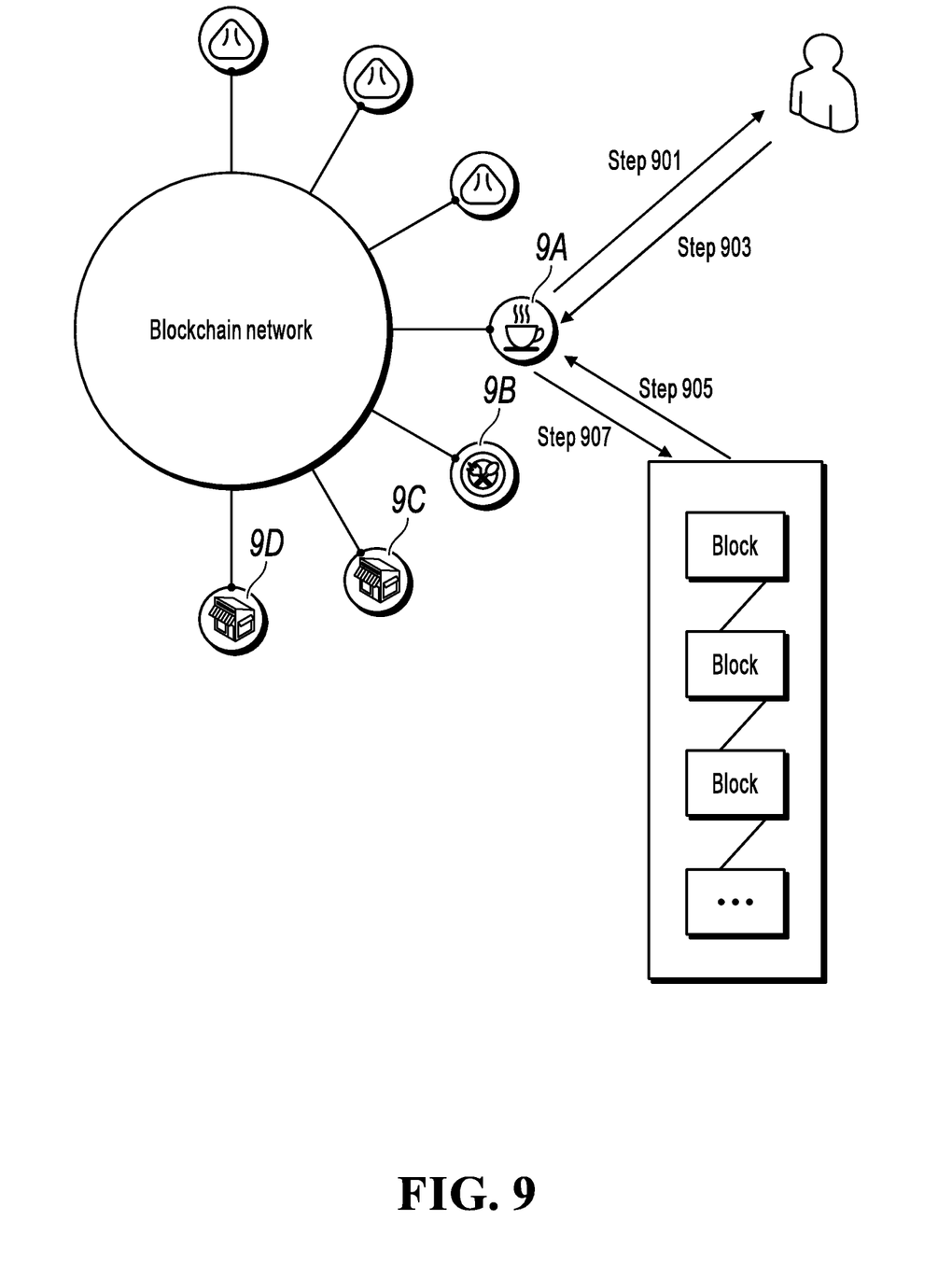
FIG. 9 is a flowchart illustrating an application instance of a resource sharing method, according to an embodiment of the present specification.

FIG. 9 is a flowchart illustrating an application instance of a resource sharing method, according to an embodiment of the present specification. Merchants 9A, 9B, 9C, and 9D described in some embodiments of the present specification are different blockchain nodes in a blockchain network.

Step 901: Merchant 9A receives a resource query request of a user, which can be specifically "I'm looking for a restaurant", "I'm looking for a supermarket", or another. This is not specifically limited here.

Then, merchant 9A determines, based on the query request, the merchant that satisfies the query condition, which can be specifically "restaurant 9B", "supermarket 9C", "supermarket 9D", etc. This is not specifically limited here.

Step 903: Recommend resources of "restaurant 9B", "supermarket 9C" and "supermarket 9D" to users, so as to share the resources of "restaurant 9B", "supermarket 9C" and "supermarket 9D".

Step 905: Receive payment for the current sharing from the blockchain network.

Step 907: Merchant 9A sends the current sharing information to the blockchain network.

Figure 10:
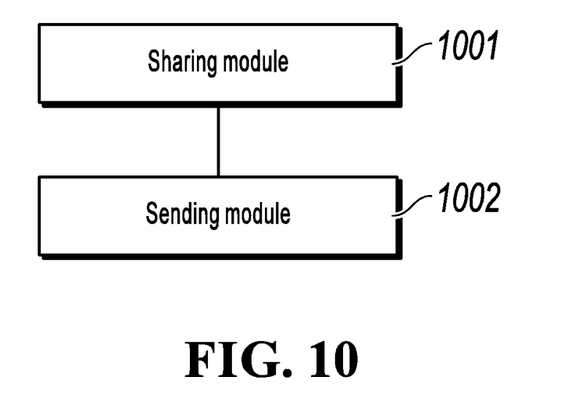
FIG. 10 is a schematic structural diagram illustrating a resource sharing apparatus, according to an embodiment of the present specification.

FIG. 10 is a schematic structural diagram illustrating a resource sharing apparatus, according to an embodiment of the present specification, and the structure is shown below.

The resource sharing apparatus described in some embodiments of the present specification can include: a sharing module 1001, configured to share a resource from a second blockchain node, and determine sharing information; and a sending module 1002, configured to send the sharing information to a blockchain network including a first blockchain node and the second blockchain node.

Optionally, sharing a resource from a second blockchain node includes: sharing the resource from the second blockchain node to generate a sharing parameter value; and determining the sharing information based on the sharing parameter value.

Optionally, sharing a resource from a second blockchain node includes: sharing the resource from the second blockchain node to generate a sharing parameter value; and determining operation information of a user on the shared resource; and determining the sharing information based on at least one of the operation information and the sharing parameter value.

According to the resource sharing apparatus described in some embodiments of the present specification, resource sharing can be implemented among blockchain nodes, and the resource sharing is no longer limited to an individual application, platform, or device. Each blockchain node can have more choices to share its resource, thereby effectively improving resource sharing efficiency. In the resource sharing solution described in some embodiments of the present specification, a blockchain mode is used to implement resource sharing, and further improve security, reliability, and tamper-resistance of the resource and the sharing information.

Based on the same inventive concept, an embodiment of the present specification further provides an electronic device, including at least one processor and a memory, where the memory stores a program, which is configured to be executed by the at least one processor to perform the following steps: sharing, by a first blockchain node, a resource from a second blockchain node, and determining sharing information; and sending the sharing information to a blockchain network including the first blockchain node and the second blockchain node.

For another function of the processor, refer to content recorded in the described embodiment. Details are not described here.

Based on the same inventive concept, an embodiment of the present specification further provides a computer readable storage medium. The computer readable storage medium includes a program used in combination with an electronic device, and a processor can execute the program to perform the following steps: sharing, by a first blockchain node, a resource from a second blockchain node, and determining sharing information; and sending the sharing information to a blockchain network including the first blockchain node and the second blockchain node.

Figure 11:
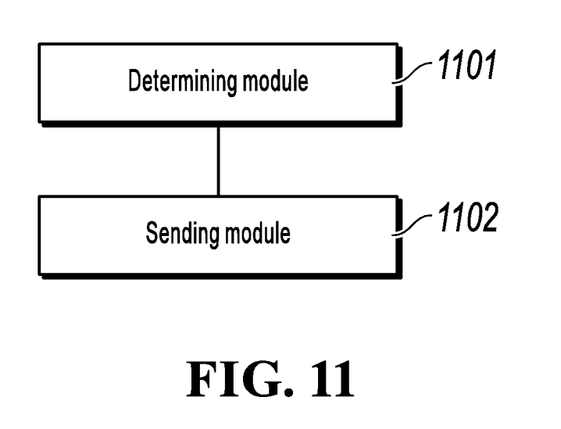
FIG. 11 is a schematic structural diagram illustrating a resource sharing apparatus, according to an embodiment of the present specification.

FIG. 11 is a schematic structural diagram illustrating a resource sharing apparatus, according to an embodiment of the present specification, and the structure is shown below.

The resource sharing apparatus described in some embodiments of the present specification can include: a determining module 1101, configured to determine sharing information of a resource from a second blockchain node by at least one first blockchain node; and a sending module 1102, configured to send the sharing information to a blockchain network including the first blockchain node and the second blockchain node.

According to the resource sharing apparatus described in some embodiments of the present specification, resource sharing can be implemented among blockchain nodes, and the resource sharing is no longer limited to an individual application, platform, or device. Each blockchain node can have more choices to share its resource, thereby effectively improving resource sharing efficiency. In the resource sharing solution described in some embodiments of the present specification, a blockchain mode is used to implement resource sharing, and further improve security, reliability, and tamper-resistance of the resource and the sharing information.

Based on the same inventive concept, an embodiment of the present specification further provides an electronic device, including at least one processor and a memory, where the memory stores a program, which is configured to be executed by the at least one processor to perform the following steps: determining, by a second blockchain node, sharing information about a resource from the second blockchain node by at least one first blockchain node; and sending the sharing information to a blockchain network including the first blockchain node and the second blockchain node.

For another function of the processor, refer to content recorded in the described embodiment. Details are not described here.

Based on the same inventive concept, an embodiment of the present specification further provides a computer readable storage medium. The computer readable storage medium includes a program used in combination with an electronic device, and a processor can execute the program to perform the following steps: determining, by a second blockchain node, sharing information about a resource from the second blockchain node by at least one first blockchain node; and sending the sharing information to a blockchain network including the first blockchain node and the second blockchain node.

Figure 12:
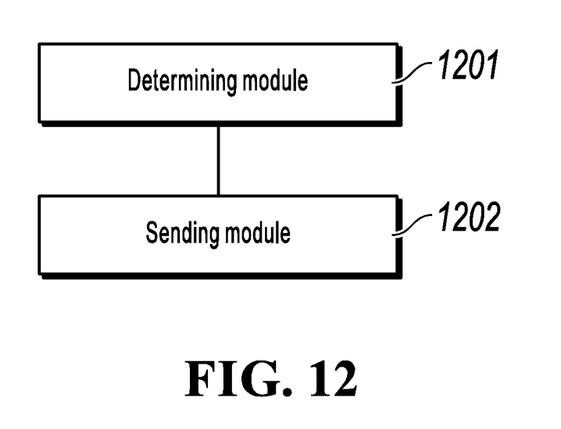
FIG. 12 is a schematic structural diagram illustrating a resource sharing apparatus, according to an embodiment of the present specification.

FIG. 12 is a schematic structural diagram illustrating a resource sharing apparatus, according to an embodiment of the present specification, and the structure is shown below.

The resource sharing apparatus described in some embodiments of the present specification can include: a determining module 1201, configured to determine sharing information about a resource with at least one blockchain node, where the blockchain node includes one of a first blockchain node and a second blockchain node, the first blockchain node is a sharing blockchain node of the resource, and the second blockchain node is a source blockchain node of the resource; and a sending module 1202, configured to send the sharing information to a blockchain network including the first blockchain node and the second blockchain node.

According to the resource sharing apparatus described in some embodiments of the present specification, resource sharing can be implemented among blockchain nodes, and the resource sharing is no longer limited to an individual application, platform, or device. Each blockchain node can have more choices to share its resource, thereby effectively improving resource sharing efficiency. In the resource sharing solution described in some embodiments of the present specification, a blockchain mode is used to implement resource sharing, and further improve security, reliability, and tamper-resistance of the resource and the sharing information.

Based on the same inventive concept, an embodiment of the present specification further provides an electronic device, including at least one processor and a memory, where the memory stores a program, which is configured to be executed by the at least one processor to perform the following steps: determining sharing information about a resource with at least one blockchain node, where the blockchain node includes one of a first blockchain node and a second blockchain node, the first blockchain node is a sharing blockchain node of the resource, and the second blockchain node is a source blockchain node of the resource; and sending the sharing information to a blockchain network including the first blockchain node and the second blockchain node.

Based on the same inventive concept, an embodiment of the present specification further provides a computer readable storage medium. The computer readable storage medium includes a program used in combination with an electronic device, and a processor can execute the program to perform the following steps: determining sharing information about a resource with at least one blockchain node, where the blockchain node includes one of a first blockchain node and a second blockchain node, the first blockchain node is a sharing blockchain node of the resource, and the second blockchain node is a source blockchain node of the resource; and sending the sharing information to a blockchain network including the first blockchain node and the second blockchain node.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, the programming is mostly implemented by modifying "logic compiler" software instead of manually making an integrated circuit chip. This is similar to a software compiler used for program development and compiling. However, original code before compiling is also written in a specific programming language, which is referred to as a hardware description language (HDL). There are many HDLs, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL). Currently, a Very-High-Speed Integrated Circuit Hardware Description Language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, device, module, or unit illustrated in the previous embodiments can be implemented by using a computer chip or an entity, or can be implemented by using a product having a certain function. A typical embodiment device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present application is implemented, a function of each unit can be implemented in one or more pieces of software and/or hardware.

A person skilled in the art should understand that an embodiment of the present disclosure can be provided as a method, a system, or a computer program product. Therefore, the present disclosure can use a form of hardware only embodiments, software only embodiments, or embodiments with a combination of software and hardware. Moreover, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the embodiments of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memories.

The memory may include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device. The computer storage medium can be used to store information accessible by the calculating device. Based on the definition in the present specification, the computer readable medium does not include transitory computer readable media (transitory media) such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The embodiments in the present specification are described in a progressive way. For same or similar parts of the embodiments, references can be made to the embodiments. Each embodiment focuses on a difference from other embodiments. Particularly, a system embodiment is similar to a method embodiment, and therefore is described briefly. For related parts, references can be made to related descriptions in the method embodiment.

The previous embodiments are embodiments of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A computer-implemented method for resource sharing, comprising:
    identifying, by a first blockchain node in a blockchain network, a resource of a second blockchain node in the blockchain network, wherein the resource comprises a wireless network signal of the second blockchain node;
    detecting, by the first blockchain node, a user terminal that enters a predetermined area;
    in response to detecting the user terminal entering the predetermined area, sharing, by the first blockchain node, the resource of the second blockchain node to the user terminal by displaying an account and a password of the wireless network signal on an operation interface of the first blockchain node;
    determining, by the first blockchain node, sharing information about a process of resource sharing by performing:
        detecting that the resource comprising the wireless network signal is accessed by the user terminal based on detecting an operation performed on the operation interface of the first blockchain node;
        determining user operation information on the resource comprising the wireless network signal; and
        determining the sharing information based on the user operation information;
    sending a consensus request to the blockchain network to perform a consensus authentication on the sharing information; and
    sending, by the first blockchain node, the sharing information to each blockchain node of the blockchain network in response to the consensus authentication being successful.

2. The computer-implemented method according to claim 1, further comprising:
    sending, by the first blockchain node to the second blockchain node, invoice information related to the resource sharing of the second blockchain node; and
    receiving, by the first blockchain node, payment information in response to sending the invoice information.

3. The computer-implemented method according to claim 1, wherein determining the sharing information based on the user operation information comprises:
    determining one or more sharing parameters including identifiers of the first blockchain node and the second blockchain node, a time the resource is shared, a number of times the resource is shared during a predetermined time period, or payment information corresponding to the sharing of the resource from the second blockchain node; and
    determining the sharing information based on the one or more sharing parameters.

4. The computer-implemented method according to claim 1, wherein the user operation information comprises:
    a quantity of user operations performed on the resource during a predetermined time period, a duration of time during which the user operations are performed on the resource, and payment information for performing the user operations.

5. A non-transitory, computer-readable medium storing one or more instructions, when executed by at least one processor, causes the at least one processor to perform operations comprising:
    identifying, by a first blockchain node in a blockchain network, a resource of a second blockchain node in the blockchain network, wherein the resource comprises a wireless network signal of the second blockchain node;
    detecting, by the first blockchain node, a user terminal that enters a predetermined area;
    in response to detecting the user terminal entering the predetermined area, sharing, by the first blockchain node, the resource of the second blockchain node to the user terminal by displaying an account and a password of the wireless network signal on an operation interface of the first blockchain node;

determining, by the first blockchain node, sharing information about a process of resource sharing by performing:
  detecting that the resource comprising the wireless network signal is accessed by the user terminal based on detecting an operation performed on the operation interface of the first blockchain node;
  determining user operation information on the resource comprising the wireless network signal; and
  determining the sharing information based on the user operation information;
sending a consensus request to the blockchain network to perform a consensus authentication on the sharing information; and
sending, by the first blockchain node, the sharing information to each blockchain node of the blockchain network in response to the consensus authentication being successful.

6. The non-transitory, computer-readable medium according to claim 5, wherein the operations further comprise:
  sending, by the first blockchain node to the second blockchain node, invoice information related to the resource sharing of the second blockchain node; and
  receiving, by the first blockchain node, payment information in response to sending the invoice information.

7. The non-transitory, computer-readable medium according to claim 5, wherein determining the sharing information based on the user operation information comprises:
  determining one or more sharing parameters including identifiers of the first blockchain node and the second blockchain node, a time the resource is shared, a number of times the resource is shared during a predetermined time period, or payment information corresponding to the sharing of the resource from the second blockchain node; and
  determining the sharing information based on the one or more sharing parameters.

8. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
  identifying, by a first blockchain node in a blockchain network, a resource of a second blockchain node in the blockchain network, wherein the resource comprises a wireless network signal of the second blockchain node;
  detecting, by the first blockchain node, a user terminal that enters a predetermined area;
  in response to detecting the user terminal entering the predetermined area, sharing, by the first blockchain node, the resource of the second blockchain node to the user terminal by displaying an account and a password of the wireless network signal on an operation interface of the first blockchain node;
  determining, by the first blockchain node, sharing information about a process of resource sharing by performing:
    detecting that the resource comprising the wireless network signal is accessed by the user terminal based on detecting an operation performed on the operation interface of the first blockchain node;
    determining user operation information on the resource comprising the wireless network signal; and
    determining the sharing information based on the user operation information;
  sending a consensus request to the blockchain network to perform a consensus authentication on the sharing information; and
  sending, by the first blockchain node, the sharing information to each blockchain node of the blockchain network in response to the consensus authentication being successful.

9. The computer-implemented system according to claim 8, wherein the operations further comprise:
  sending, by the first blockchain node to the second blockchain node, invoice information related to the resource sharing of the second blockchain node; and
  receiving, by the first blockchain node, payment information in response to sending the invoice information.

10. The computer-implemented system according to claim 8, wherein determining the sharing information based on the user operation information comprises:
  determining one or more sharing parameters including identifiers of the first blockchain node and the second blockchain node, a time the resource is shared, a number of times the resource is shared during a predetermined time period, or payment information corresponding to the sharing of the resource from the second blockchain node; and
  determining the sharing information based on the one or more sharing parameters.

11. The non-transitory, computer-readable medium according to claim 5, wherein the user operation information comprises:
  a quantity of user operations performed on the resource during a predetermined time period, a duration of time during which the user operations are performed on the resource, and payment information for performing the user operations.

12. The computer-implemented system according to claim 8, wherein the user operation information comprises:
  a quantity of user operations performed on the resource during a predetermined time period, a duration of time during which the user operations are performed on the resource, and payment information for performing the user operations.

* * * * *